(12) United States Patent
Liao et al.

(10) Patent No.: US 12,229,496 B2
(45) Date of Patent: Feb. 18, 2025

(54) CONVERSATIONAL AGENT COUNTERFACTUAL SIMULATION

(71) Applicant: International Business Machines Corporation, Armonk, NY (US)

(72) Inventors: Vera Liao, White Plains, NY (US); Yunfeng Zhang, Chappaqua, NY (US); Stephanie Houde, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 17/541,307

(22) Filed: Dec. 3, 2021

(65) Prior Publication Data

US 2023/0177255 A1 Jun. 8, 2023

(51) Int. Cl.
*G06F 40/166* (2020.01)
*G06F 40/35* (2020.01)

(52) U.S. Cl.
CPC ............ *G06F 40/166* (2020.01); *G06F 40/35* (2020.01)

(58) Field of Classification Search
CPC ......... G06F 40/166; G06F 40/35; G06N 3/09; G06N 3/006; G06N 3/045; G06N 3/088; G09B 7/04
See application file for complete search history.

(56) References Cited

U.S. PATENT DOCUMENTS

| 7,403,890 | B2 | 7/2008 | Roushar |
| 9,972,304 | B2 | 5/2018 | Paulik |
| 10,847,142 | B2 | 11/2020 | Newendorp |
| 10,937,446 | B1* | 3/2021 | Wong ............... G06N 3/044 |
| 10,956,682 | B2 | 3/2021 | Ekambaram |
| 11,043,205 | B1 | 6/2021 | Su |
| 11,055,355 | B1* | 7/2021 | Monti ............... G06F 16/90332 |
| 2012/0084120 | A1* | 4/2012 | Hirsch ............... G06Q 30/02 705/7.32 |
| 2017/0308609 | A1* | 10/2017 | Berkhin ............... G06F 16/951 |
| 2018/0090136 | A1* | 3/2018 | Connell, II ............ G06F 40/20 |

(Continued)

FOREIGN PATENT DOCUMENTS

| CN | 108021703 A | 5/2018 |
| CN | 111522982 A | 8/2020 |
| TW | 202117584 A | 5/2021 |

OTHER PUBLICATIONS

Dhoolia, Pankaj, et al. "A cognitive system for business and technical support: A case study." IBM Journal of Research and Development 61.1 (2017), pp. 1-12 (Year: 2017).*

(Continued)

*Primary Examiner* — Jesse S Pullias
*Assistant Examiner* — Michael C. Lee
(74) *Attorney, Agent, or Firm* — Aaron Pontikos (57) ABSTRACT

A computer-implemented method for counterfactual conversation simulation is disclosed. The computer-implemented method includes generating a system output based, at least in part, on a user input. The computer-implemented method further includes determining that a system output/user input pair is not satisfactory based, at least in part, on a system output/user input score being below a predetermined threshold. The computer-implemented method further includes generating, in response to determining the system output/user input pair is not satisfactory, a counterfactual simulation of the user input based, at least in part, on a target intent of the user input.

17 Claims, 5 Drawing Sheets

(56) References Cited

U.S. PATENT DOCUMENTS

| | | | |
|---|---|---|---|
| 2018/0232376 | A1 | 8/2018 | Zhu |
| 2019/0019160 | A1* | 1/2019 | Champaneria ............ G06N 5/04 |
| 2019/0130311 | A1 | 5/2019 | Anders et al. |
| 2020/0105156 | A1 | 4/2020 | Naidu et al. |
| 2020/0294497 | A1* | 9/2020 | Kirazci ................. G10L 13/027 |
| 2021/0089624 | A1 | 3/2021 | Bealby-Wright et al. |
| 2021/0312304 | A1 | 10/2021 | Keena et al. |
| 2021/0312399 | A1* | 10/2021 | Asokan ................. G10L 15/063 |
| 2021/0357835 | A1* | 11/2021 | Modi .................... G06F 40/194 |

OTHER PUBLICATIONS

Aithal, Shivani G., et al. "Automatic question-answer pairs generation and question similarity mechanism in question answering system." Applied Intelligence (Apr. 7, 2021), pp. 1-14 (Year: 2021).*

Ben-David, et al. "Improved Goal Oriented Dialogue via Utterance Generation and Look Ahead." arXiv preprint arXiv:2110.12412 (Oct. 24, 2021), pp. 1-13 (Year: 2021).*

Langer, Markus, et al. "Spare me the details: How the type of information about automated interviews influences applicant reactions." International Journal of Selection and Assessment 29.2 (May 2021), pp. 154-169 (Year: 2021).*

Yu, Zhou, et al. "An open-source dialog system with real-time engagement tracking for job interview training applications." Advanced Social Interaction with Agents: 8th International Workshop on Spoken Dialog Systems. Springer International Publishing, 2019, pp. 199-207 (Year: 2019).*

Mujtaba, Dena F., and Nihar R. Mahapatra. "Ethical considerations in AI-based recruitment." 2019 IEEE International Symposium on Technology and Society (ISTAS). IEEE, 2019, pp. 1-7 (Year: 2019).*

Laiq, Muhammad, et al. "Chatbot-based interview simulator: a feasible approach to train novice requirements engineers." 2020 10th International workshop on requirements engineering education and training (REET). IEEE, 2020. (Year: 2020).*

Miao, Yingying, et al. "Research on Interaction Design of Artificial Intelligence Mock Interview Application Based on Goal-Directed Design Theory." Springer International Publishing, 2020. (Year: 2020).*

Broekens et al., "Virtual Reality Negotiation Training Increases Negotiation Knowledge and Skill", In International Conference on Intelligent Virtual Agents, Sep. 2012, LNAI 7502, pp. 218-230, Springer-Verlag Berlin Heidelberg.

Chromik, Michael, "Human-centric Explanation Facilities: Explainable AI for the Pragmatic Understanding of Non- expert End Users", Dissertation, Munchen, den Sep. 4, 2021, English Abstract, 125 pages.

Dhurandhar et al., "Explanations based on the missing: Towards Contrastive Explanations with Pertinent Negatives", arXiv:1802.07623v2 [cs.AI] Oct. 29, 2018, 22 pages.

Fu et al., "Style Transfer in Text: Exploration and Evaluation", arXiv:1711.06861v2 [cs.CL] Nov. 27, 2017, 9 pages.

Jung et al., "The Affective Virtual Patient: An E-learning Tool for Social Interaction Training within the Medical Field", (2005), In Proceedings of International Conference TESI-Training Education & Education, 9 pages.

Li et al. "Adversarial learning for neural dialogue generation," arXiv:1701.06547v5 [cs.CL] Sep. 24, 2017, 13 pages.

Mell et al., "The NIST Definition of Cloud Computing", Recommendations of the National Institute of Standards and Technology, NIST Special Publication 800-145, Sep. 2011, 7 pages.

Mothilal et al., "Explaining Machine Learning Classifiers through Diverse Counterfactual Explanations", FAT* '20, Jan. 27-30, 2020, Barcelona, Spain, https://doi.org/10.1145/3351095.3372850, 11 pages.

Park et al. "KLUE: Korean Language Understanding Evaluation," arXiv:2105.09680v3 [cs.CL] Jun. 11, 2021, 76 pages.

Reimers et al., "Sentence-BERT: Sentence Embeddings using Siamese BERT-Networks", Proceedings of the 2019 Conference on Empirical Methods in Natural Language Processing and the 9th International Joint Conference on Natural Language Processing, pp. 3982-3992, Hong Kong, China, Nov. 3-7, 2019.

Samanta et al., Towards Crafting Text Adversarial Samples, arXiv:1707.02812v1 [cs.LG] Jul. 10, 2017, 11 pages.

Sokol et al., "Conversational Explanations of Machine Learning Predictions Through Class-contrastive Counterfactual Statements", Proceedings of the Twenty-Seventy International Joint Conference on Artificial Intelligence (IJCAI-2018), 2 pages.

Subramanian et al., "Multiple-Attribute Text Style Transfer", Published as a conference paper at ICLR 2019, arXiv:1811.00552v2 [cs.CL] Sep. 20, 2019, 20 pages.

Traum et al., "Negotiation over Tasks in Hybrid Human-Agent Teams for Simulation-Based Training", AAMAS'03, Jul. 14-18, 2003, Melbourne, Australia, 8 pages.

Wexler et al., "The What-If Tool: Interactive Probing of Machine Learning Models", IEEE Transactions on Visualization and Computer Graphics, vol. 26, No. 1, Jan. 2020, Digital Object Identifier No. 10.1109/TVCG.2019.2934619, 10 Pages.

Zhang et al., "Style Transfer as Unsupervised Machine Translation", arXiv:1808.07894v1 [cs.CL] Aug. 23, 2018, 9 pages.

Zheng et al. "FinBrain: when finance meets AI 2.0," Frontiers of Information Technology & Electronic Engineering, 2019 20(7), pp. 914-924.

Carneiro et al., "A Conversational Interface for interacting with Machine Learning models", CIICESI/ESTG, Polit_ecnico do Porto, Portugal, Copyright © 2022 for this paper by its authors, 18 pages.

Hendricks et al. "Generating Counterfactual Explanations with Natural Language", arXiv:1806.09809, Jun. 26, 2018, 4 pages.

* cited by examiner

CONVERSATIONAL AGENT COUNTERFACTUAL SIMULATION

BACKGROUND

The present invention relates generally to the field of conversational agents, and more particularly to, conversational agents simulating conversations for training purposes.

Conversational agents, such as chatbots, can act as conversational virtual agents to engage in conversations with a user. A conversational agent is a software program which interprets and responds to statements made by users in ordinary language by integrating computational linguistics techniques with communication over the internet. A chatbot, which is a type of conversational agent, is a software application used to conduct an on-line chat conversation via text or text-to-speech software, in lieu of providing direct contact with a live human agent. One use case of a conversational agent is to simulate conversations for training and coaching purposes. For example, a conversational agent can simulate a practice interview for a user to assist in practicing interview skills by asking the user interview questions and responding to the user's answers.

SUMMARY

According to one embodiment of the present invention, a computer-implemented method for counterfactual conversation simulation is disclosed. The computer-implemented method includes generating a system output based, at least in part, on a user input. The computer-implemented method further includes determining that a system output/user input pair is not satisfactory based, at least in part, on a system output/user input score being below a predetermined threshold. The computer-implemented method further includes generating, in response to determining the system output/user input pair is not satisfactory, a counterfactual simulation of the user input based, at least in part, on a target intent of the user input.

According to another embodiment of the present invention, a computer program product for counterfactual conversation simulation is disclosed. The computer program product includes one or more computer readable storage media and program instructions stored on the one or more computer readable storage media. The program instructions include instructions to generate a system output based, at least in part, on a user input. The program instructions further include instructions to determine that a system output/user input pair is not satisfactory based, at least in part, on a system output/user input score being below a predetermined threshold. The program instructions further include instructions to generate, in response to determining the system output/user input pair is not satisfactory, a counterfactual simulation of the user input based, at least in part, on a target intent of the user input.

According to another embodiment of the present invention, a computer system for counterfactual conversation simulation is disclosed. The computer system includes one or more computer processors, one or more computer readable storage media, and computer program instructions, the computer program instructions being stored on the one or more computer readable storage media for execution by the one or more computer processors. The program instructions include instructions to generate a system output based, at least in part, on a user input. The program instructions further include instructions to determine that a system output/user input pair is not satisfactory based, at least in part, on a system output/user input score being below a predetermined threshold. The program instructions further include instructions to generate, in response to determining the system output/user input pair is not satisfactory, a counterfactual simulation of the user input based, at least in part, on a target intent of the user input.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of conversational agents, and more particularly to, conversational agents simulating conversations for training purposes.

Conversational agents can be used to simulate conversations with users in order to train the user or offer a practice environment for users. Currently, conversational agents use an intent-based model. An intent-based model is a multi-class classifier that can be trained by a developer to define the intents, such as types of questions (e.g., a question about opening hours), and wherein each intent is associated with an answer to the question (e.g., an answer about opening hours). Intent-based models attempt to classify which intent the user input belongs to and then the associated answer is provided as a response. Each class or intent is trained with positive training examples, which are variations of how people would speak with that intent, such as different ways to ask or say something with same intent (i.e., different ways to ask about opening hours). Text based machine learning models can be used to analyze user input in order to generate other types of system outputs. System outputs can comprise scoring functions (e.g., predicted job fitting score) or user attributes (e.g., predicted interviewer perception of the user such as "confident" or "collaborative"). For example, conversational agents can be used for training a user to prepare for an interview. In this use case, the conversational agent may ask the user interview questions via a chatbox and the user answers the interview questions via the chatbox.

Embodiments of the present invention recognize that current conversational agents that use intent-based models do not provide enough support for users to understand why their answers or speeches are unsatisfactory, as well as how to make improvements. Embodiments of the present invention recognize the need for users to be able to improve their answers and how they talk for training and coaching purposes.

Embodiments of the present invention uses simulation to help users explore questions as counterfactual simulation. Counterfactual simulation is the modification of user input in a semantically meaningful way, in which a specified alternative output is generated. Feedback from conversational agents using counterfactual simulation can show how changing the phrasing of a question or answer can prompt different responses from the conversational agent for purposes of training the user. For example, a conversational agent in an interview simulation can ask the user a question and critique the user's response to show how the response can be more concise or have particular attributes such as confidence. Embodiments of the present invention provide users with insight to improve users input or answers with counterfactual simulation of the users own input. Embodiments of the present invention generate one or more outputs of chat box utterance responding to the user, a scoring output based on the user input, or a user attribute judged by the system.

Embodiments of the present invention generate a counterfactual simulation.

Embodiments of the present invention generate a counterfactual instance selector from a corpus of texts associated with alternative system output (e.g., positive training data) and select one that is closest to the user input. Embodiments of the present invention generate a counterfactual text modifier in those instances when a corpus of text is not available, and modify the words in the user input with semantically meaningful replacements associated with the alternative class until the constructed sentence results in the targeted alternative output.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
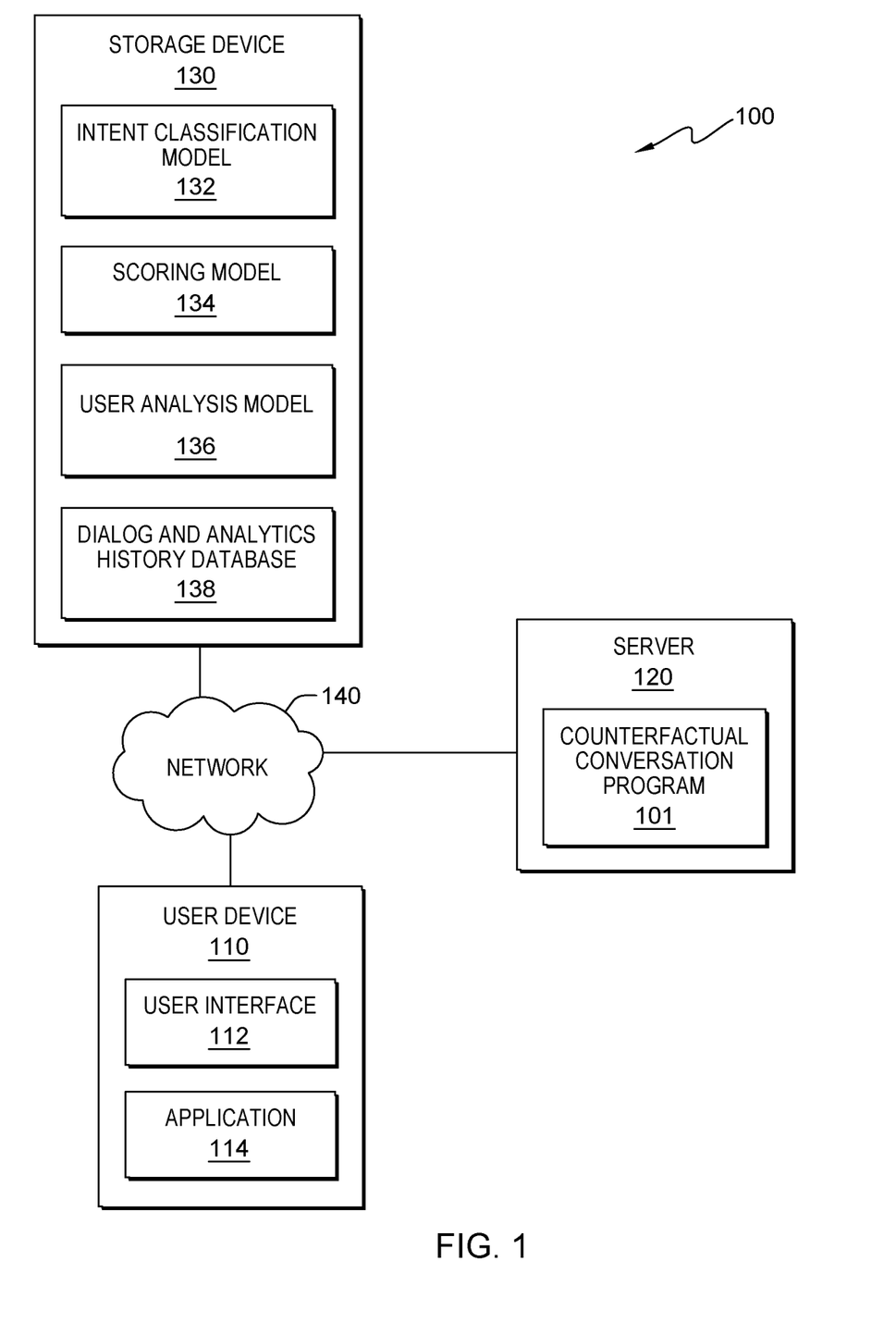
FIG. 1 is a block diagram of a network computing environment for a counterfactual conversation program 101, generally designated 100, in accordance with at least one embodiment of the present invention.

The present invention will now be described in detail with reference to the Figures. FIG. 1 is a functional block diagram of a network computing environment for a counterfactual conversation program 101, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing. GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 is utilized to interact with and display information related to conversations conducted between a conversational agent and a user. For example, user interface 112 can be a text-based interface, audio based interface, or video based interface utilized by a user to interact with a conversational agent.

Application 114 can be representative of one or more applications (e.g., an application suite) that operate on user device 110. In an embodiment, application 114 is representative of one or more applications (e.g., conversational agent applications) located on user device 110. In various example embodiments, application 114 can be an application that a user of user device 110 utilizes to engage in conversations with a conversational agent. In an embodiment, application 114 can be a client-side application associated with a server-side application running on server 120 (e.g., a client-side application associated with counterfactual conversation program 101). In an embodiment, application 114 can operate to perform processing steps of counterfactual conversation program 101 (i.e., application 114 can be representative of counterfactual conversation program 101 operating on user device 110).

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes counterfactual conversation program 101. In an embodiment, counterfactual conversation program 101 may be configured to access various data sources, such as user analysis model 136 and dialog and analytics history database 138 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, counterfactual conversation program 101 enables the authorized and secure processing of personal data. In an embodiment, counterfactual conversation program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, counterfactual conversation program 101 provides information regarding personal data and the nature (e.g., type, scope, purpose, duration, etc.) of the processing. In an embodiment, counterfactual conversation program 101 provides a user with copies of stored personal data. In an embodiment, counterfactual conversation program 101 allows for the correction or completion of incorrect or incomplete personal data. In an embodiment, counterfactual conversation program 101 allows for the immediate deletion of personal data.

Figure 3:
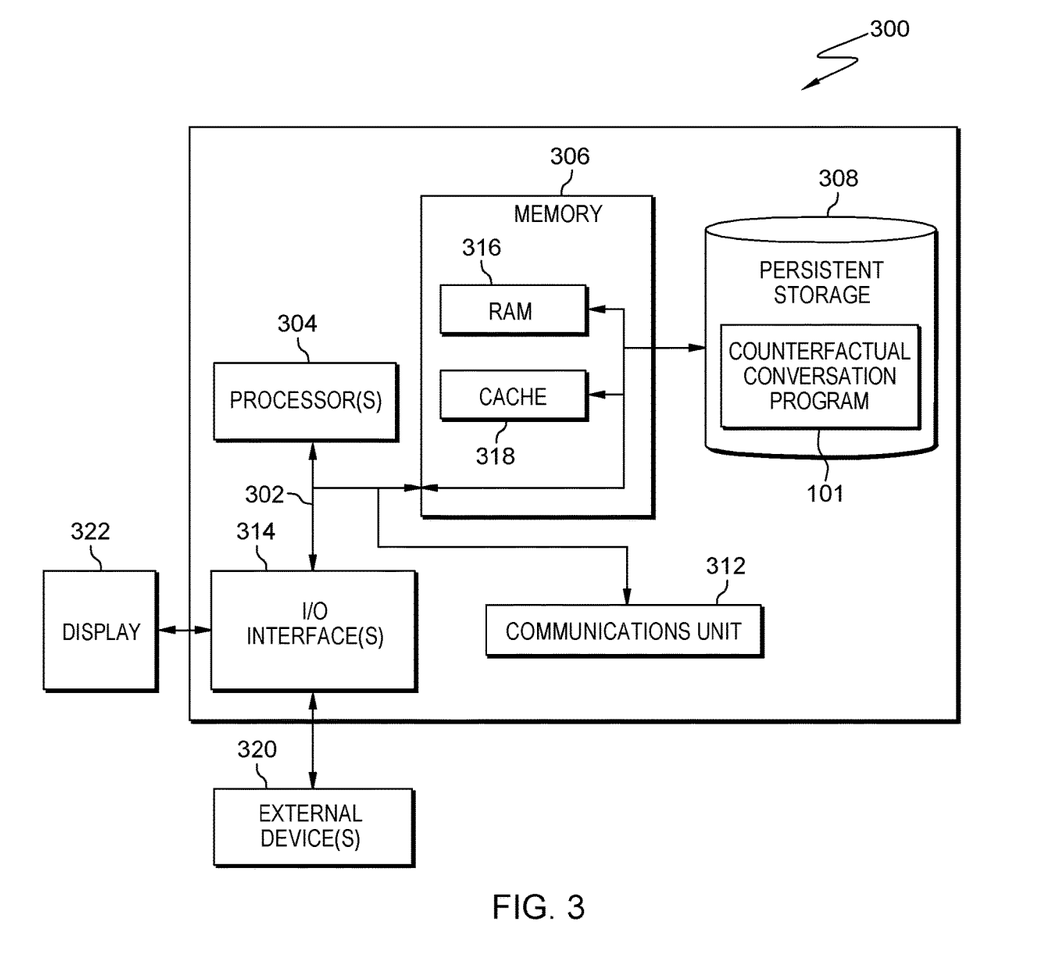
FIG. 3 is a block diagram depicting components of a computer, generally designated 300, suitable for executing a counterfactual conversation program 101, in accordance with at least one embodiment of the present invention.
Figure 4:
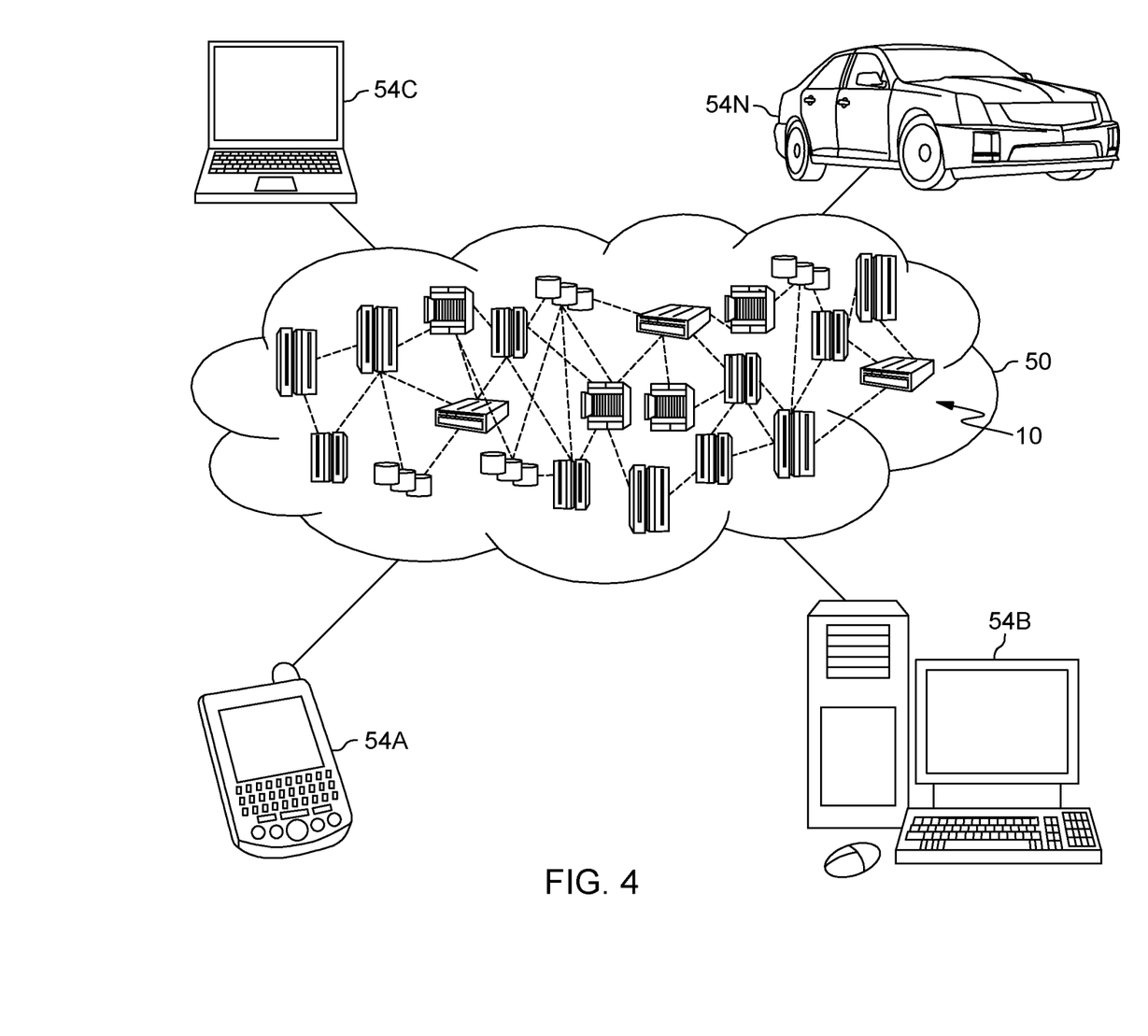
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for persistently storing chat database dialogs, history, and models utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 includes intent classification model 132, scoring model 134, user analysis model 136, and dialog and analytics history database 138. In an embodiment, intent classification model 132 is a machine learning model that has been trained from a plurality of text descriptions to represent one or more intents or concepts of respective text descriptions. In an embodiment, intent classification model 132 is utilized by counterfactual conversation program 101 to determine one or more text descriptions to represent one or more intents or concepts for use as a counterfactual simulation response. In an embodiment, counterfactual conversation program 101 receives user input and counterfactual conversation program 101 utilizes intent classification model 132 to determine the intent of the user input. For example, counterfactual conversation program 101 receives user input of a user answering a question, and counterfactual conversation program 101 utilizes classification model 132 to determine the intent of the user input answer.

In an embodiment, scoring model 134 is a trained machine learning model used to classify, rank, and score the accuracy of the response of the user. For example, if counterfactual conversation program 101 asks the user "what are your greatest strengths as a candidate?", scoring model 134 is used to classify, rank, or otherwise score the accuracy of the user's response to the proposed question. In an embodiment, the rank or score of the accuracy of the user's response is numerical. For example, if counterfactual conversation program 101 asks the user "what are your greatest strengths as a candidate?", and the user replies "I am a fast learner", counterfactual conversation program 101 scores the user's response a 4 out of 10.

In an embodiment, user analysis model 136 is a machine learning model used to determine the personality aspects or attributes of the user's response. In an embodiment, user analysis model 136 is used to determine one or more attributes based on the dialogue. For example, if counterfactual conversation program 101 asks the user "what are your greatest strengths as a candidate?", and the user replies "I am a fast learner", user analysis model 136 can be used to determine one or more attributes associated with the response that the user can improve on based on the user's reply. Further, user analysis model 136 can be used to determine a degree of confidence of the user's response. In another embodiment, counterfactual conversation program 101 modifies the user's original answer to improve one or more identified attributes. In another embodiment, counterfactual conversation program 101 recommends to the user to reply to the same question with a response of "I am a fast learner and enjoy learning new tasks" as a more confident response.

In an embodiment, dialog and analytics history database 138 includes information on the conversational history of at least one of a conversational agent and a user. In an embodiment, the information included in dialog and analytics history database 138 is accessed to train or retrain one or more models, such as intent classification model 132, scoring model 134, and user analysis model 136.

In an embodiment, counterfactual conversation program 101 receives user input. In an embodiment, the user input is textual or verbal. In an embodiment, the user input is any text received in a chatbox from the user. In an embodiment, the user input is a reply or response to a question from counterfactual conversation program 101.

In an embodiment, counterfactual conversation program 101 generates a system output based, at least in part, on the user input. In an embodiment, the system output is based, at least in part, on the corpus of candidate text available. In those embodiments where there is a corpus of candidate texts available, counterfactual conversation program 101 performs a counterfactual instance selection to find the text instance closest to (i.e., that best matches) the original user input but associated with the targeted alternative system output. In an embodiment, counterfactual conversation program 101 selects a candidate text from the corpus of candidate texts based on the target intent of the user input. In an embodiment, the target intent of the user input is an understanding of the user input by a conversational agent. For example, if the user input is a question, such as "would you like to buy an umbrella insurance policy which will cover any costs above your current liability insurance?", then the target intent is the conversational agent understanding the user's question (i.e., do you want to purchase an umbrella insurance policy? In an embodiment, the target intent of the user input is a personality attribute associated with the user input. For example, if the conversational agent asks "why would you be a good fit for this job?" and the user input is an answer, such as "I'm not sure, I like being busy", counterfactual conversation program 101 determines the target intent of the user input is confidence. In this scenario, counterfactual conversation program 101 determines the attribute "non-confident" from the user's response, and thus ultimately determines that the user input does not meet the target intent.

In an embodiment, the text instance from the user input is linked to a targeted system output (e.g., trained data for a particular intent). In an embodiment, counterfactual conversation program 101 selects from the instances linked to the targeted alternative output and ranks by their distance with the original user input. In an embodiment, string distance metrics are used to measure the distance between two text strings for approximating the string matching or comparison in string searching. In an embodiment, counterfactual conversation program 101 utilizes one or more deep neural networks based language models (e.g., BERT) to generate sentence embeddings. In an embodiment, the sentence embeddings are used to find sentences relevant to the targeted alternative output based, at least in part, on the target intent of the user input.

In those embodiments where a corpus of candidate texts are unavailable, counterfactual conversation program 101 performs counterfactual text modifications to modify the current user input based, at least in part on, the target input of the user input until it results in the targeted alternative output. In an embodiment, counterfactual conversation program 101 identifies salient words that contribute to the current system output, and then either removes or replaces the salient words with semantically similar words from a dictionary known to be associated with the targeted alternative output (e.g., keywords in job descriptions; phrases appropriate for a job interview). In an embodiment, counterfactual conversation program 101 utilizes an unsupervised style transfer (e.g., more "confident" style of phrasing) algorithm. Language style transferring algorithms rephrase text with specific stylistic attributes while preserving the original attribute or content. Unsupervised machine translation methods are used when there is a lack of parallel data where the source sentence is in one style and the target sentence is in another style. In an embodiment, counterfactual conversation program 101 rephrases text for specific styles based on unsupervised machine translation approaches.

In an embodiment, counterfactual conversation program 101 determines if a user input/system output pair is satisfactory. In an embodiment, the user input/system output pair is satisfactory if the system input properly answers the system output proposed question or vice versa. For example, if the system output from counterfactual conversation program 101 is "why are you qualified for this job" and the training user input is "I'm a quick learner," counterfactual conversation program 101 determines the training user input answers the question of the system output and the pair is satisfactory. In an embodiment, the user input/system output pair is satisfactory when the intent of the system input and the system output matches. In an embodiment, counterfactual conversation program 101 determines a user input/system output pair is satisfactory if a user input/system output pair score is above a predetermined threshold. In an embodiment, counterfactual conversation program 101 determines a user input/system output pair is satisfactory if there is a level of understanding of the user input above a predetermined threshold. Following the previous example, of system output "why are you qualified for this job" and the training user input is "I'm a quick learner," counterfactual conversation program 101 assigns a score of 6/10. In this example, if the predetermined threshold for answering the question is 5/10, counterfactual conversation program 101 determines the training user input answers the question and the pair is satisfactory.

In an embodiment, in response to determining the user input/system output pair is unsatisfactory, counterfactual conversation program 101 generates a counterfactual simulation based, at least in part, on the user input/system output pair. In an embodiment, counterfactual conversation program 101 modifies the user input in a semantically meaningful way, and generates a specified alternative output. In an embodiment, counterfactual conversation program 101 generates a counterfactual simulation to help users explore questions as counterfactual simulation.

In embodiments where there is a corpus of candidate texts available, counterfactual conversation program 101 generates a counterfactual simulation of the user input by selecting a candidate text from the corpus of candidate texts based on the target intent of the user input. For example, if the conversational agent asks "why would you be a good fit for this job?" and the user input is an answer, such as "I'm not sure, I like being busy", counterfactual conversation program 101 determines the target intent of the user input is confidence. In this scenario, counterfactual conversation program 101 determines the attribute "non-confident" from the user's response, and thus ultimately determines that the user input does not meet the target intent. Further, counterfactual conversation program 101 selects a candidate text from the corpus of candidate texts based on the target intent "confidence." Counterfactual conversation program 101 selects and generates a counterfactual simulation of "I am a good fit for this job because I am a hard worker."

In embodiments where a corpus of candidate texts is not available, counterfactual conversation program 101 performs a counterfactual text modification of the user input based on the target intent of the user input. In embodiments where a corpus of candidate texts is not available, counterfactual conversation program 101 performs a counterfactual text modification of the system output based on the target intent of the system output.

In an example, counterfactual conversation program 101 trains a user customer care agent A to better phrase how they ask questions or provide information for better customer satisfaction. In this example, an experienced customer care agent utilizes counterfactual conversation program 101 to provide good examples of utterances as training data for each intent. In this example, customer care agent A is the acting customer care agent and counterfactual conversation program 101 is simulating a customer. In this example, customer care agent A and counterfactual conversation program 101 engage in the following conversation:

Customer care agent A: Are you interested in purchasing an additional umbrella policy? Counterfactual conversation program 101: I am not sure I understood what you mean.

In this example, counterfactual conversation program 101 determines it is unlikely that the customer understands the term "umbrella policy." Counterfactual conversation program 101, simulating a customer looking to purchase home insurance, provides a "do-not-understand" response. Counterfactual conversation program 101 receives user input requesting counterfactual simulation for the targeted intent "inquiring interest in umbrella policy" (i.e., how to rephrase the question in order to be understood correctly by the customer). Counterfactual conversation program 101 generates a counterfactual user input by searching for an example from a corpus of positive training examples that base matches the intent "inquiring interest on umbrella policy."Counterfactual conversation program 101 transmits the best matching example to the user customer care agent A. In this example, customer care agent A and counterfactual conversation program 101 further engage in the following conversation:

Customer care agent A: Are you interested in purchasing an umbrella liability policy that will cover any costs above your liability insurance?

Counterfactual conversation program 101: Yes. I would like to know about the cost of an umbrella liability policy.

In this example, counterfactual conversation program 101 rephrases the question so it is correctly understood by the customer. Counterfactual conversation program 101 improves the phrasing of the question of Customer care agent A in order to keep the intent of the question but thoroughly explain the meaning of "umbrella policy" in a way the customer is likely to understand.

In another example, counterfactual conversation program 101 simulates a job interview training conversational agent used to train a user (interviewee). In this example, counterfactual conversation program 101 is trained by a regression model using historical interview dialogs and a corresponding job posting with labeled fit scores for one or more answers. In this example, counterfactual conversation program 101 generates a score based on the user's answer to the interview questions to assist the user in improving their interview skills. In this example, the user and counterfactual conversation program 101 further engage in the following conversation:

Counterfactual conversation program 101: Why do you think you are a good fit for this job?

User: I am a fast learner.

In this example, counterfactual conversation program 101 determines that the user input ("I am a fast learner") and the system output pair ("Why do you think you are a good fit for this job?") is not satisfactory. Counterfactual conversation program 101 determines the user did not come across as being confident in their answer. Counterfactual conversation program 101 gives a low fitting score based on the user input of "I am a fast learner." In this example, counterfactual conversation program 101 generates a counterfactual text modifying the user's answer until it reaches a higher fitting score (i.e., until the score is above a predetermined threshold).

In another example, counterfactual conversation program 101 simulates a job interview training conversational agent used to train user (interviewee). In this example, counterfactual conversation program 101 generates attributes or dialogues to assist the user in improving their interview skills. In this example, the user and counterfactual conversation program 101 further engage in the following conversation:

Counterfactual conversation program 101: Why do you think you are a good fit for this job?

User: I am a fast learner.

In this example, counterfactual conversation program 101 generates a list of attributes associated with the user based on the dialogue (e.g., personality analytics). In this example, counterfactual conversation program 101 receives user input that the user would like to sound more confident when answering interview questions. Counterfactual conversation program 101 determines that the user did not come across as being confident in their answer and assigns a low fitting score of a 4 out of 10 to the user's answer. Counterfactual conversation program 101 then generates counterfactual text simulation to modify the original user input answer of "I am a fast learner." In this example, counterfactual conversation program 101 simulates one or more additional interview dialogues (i.e., as new user input into the system), to exemplify to the user how changing the user input answer changes how counterfactual conversation program 101 answers, and how this changes the way the user is perceived and how the scores may change. In this example, counterfactual conversation program 101 further simulates the following conversation as an example to the user as both the interviewer and the interviewee:

Counterfactual conversation program 101 (as interviewer): Why do you think you are a good fit for this job?

Counterfactual conversation program 101 (as interviewee): I am quick learner and I enjoy learning new tasks. I am eager to help with assignments outside my comfort zone.

Counterfactual conversation program 101 determines the new answer, provided by counterfactual conversation program 101 posing as the interviewee has a high fitting score of an 8 out of 10 and displays the new high fitting score to the user.

Figure 2:
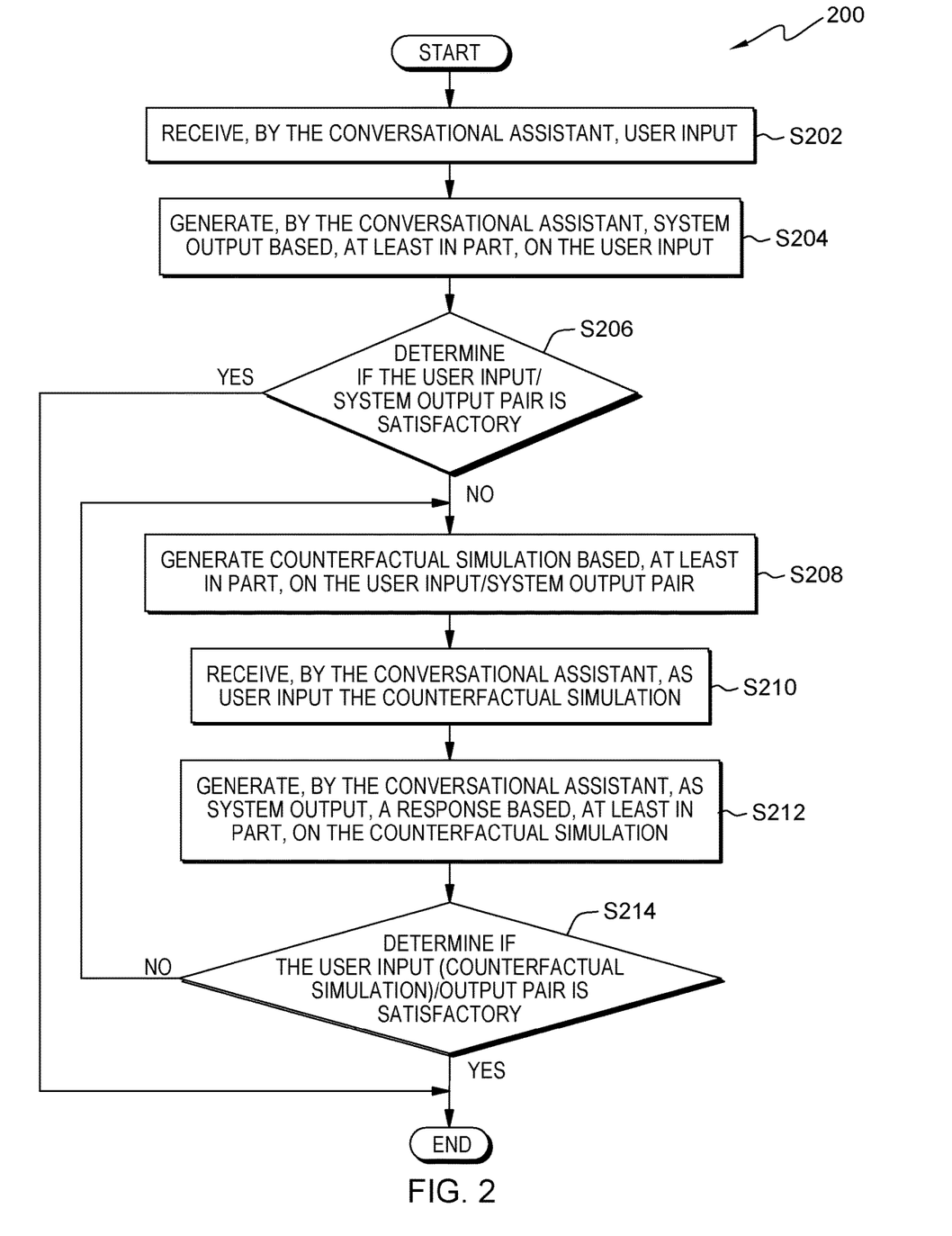
FIG. 2 is a flow chart diagram depicting operational steps for a counterfactual conversation program 101, generally designated 200, in accordance with at least one embodiment of the present invention.

FIG. 2 is a flow chart diagram depicting operational steps for counterfactually training user input by counterfactual conversation program 101, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, counterfactual conversation program 101 receives, by a conversational assistant, user input. In an embodiment, counterfactual conversation program 101 is a conversational agent. In an embodiment, the counterfactual conversation program 101 is a chatbox. In an embodiment, counterfactual conversation program 101 is a virtual assistant. In an embodiment, the user input is at least one of posing a question or providing an answer to a question.

At step S204, counterfactual conversation program 101 generates, by the conversational assistant, system output based, at least in part, on the user input. In an embodiment, the system output is at least one of posing a question or providing an answer to a question.

At decision step S206, counterfactual conversation program 101 determines if the user input/system output pair is satisfactory (i.e., above a predetermined threshold). In an embodiment, counterfactual conversation program 101 determines that the user input/system output pair is satisfactory if the user input answers the question asked in the system output. In an embodiment, counterfactual conversation program 101 determines that the user input/system output pair is satisfactory if the system output answers the question asked in the user input. If it is determined that the user input/system output pair is satisfactory (decision step S206 "YES" branch), counterfactual conversation program 101 ends. If it is determined that the user input/system output pair is not satisfactory (decision step S206 "NO" branch), counterfactual conversation program 101 proceeds to step S208.

At step S208, counterfactual conversation program 101 generates a counterfactual simulation based, at least in part, on the user input/system output pair. In an embodiment, counterfactual conversation program 101 modifies the user input in a semantically meaningful way, and generates a specified alternative output. In an embodiment, counterfactual conversation program 101 generates a counterfactual simulation to help users explore questions as counterfactual simulation. In an embodiment, counterfactual conversation program 101 generates a counterfactual simulation based, at least in part, on the target intent of the user input.

At step S210, counterfactual conversation program 101 receives, by the conversational assistant, as user input the counterfactual simulation.

At step S212, counterfactual conversation program 101 generates, by the conversational assistant, as system output, a response based, at least in part, on the counterfactual simulation.

At decision step S214, counterfactual conversation program 101 determines if the user input (counterfactual simulation)/output pair is satisfactory. In an embodiment, counterfactual conversation program 101 determines that the user input/system output pair is satisfactory if the user input answers the question asked in the system output. In an embodiment, counterfactual conversation program 101 determines the user input/system output pair is satisfactory if the system output answers the question asked in the user input. If it is determined that the user input/system output pair is satisfactory (decision step S214 "YES" branch), counterfactual conversation program 101 ends. If it is determined that the user input/system output pair is not satisfactory (decision step S206 "NO" branch), counterfactual conversation program 101 returns to step S208.

FIG. 3 is a block diagram depicting components of a computing device, generally designated 300, suitable for counterfactual conversation program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes counterfactual conversation program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile computer readable storage media.

Program instructions for counterfactual conversation program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
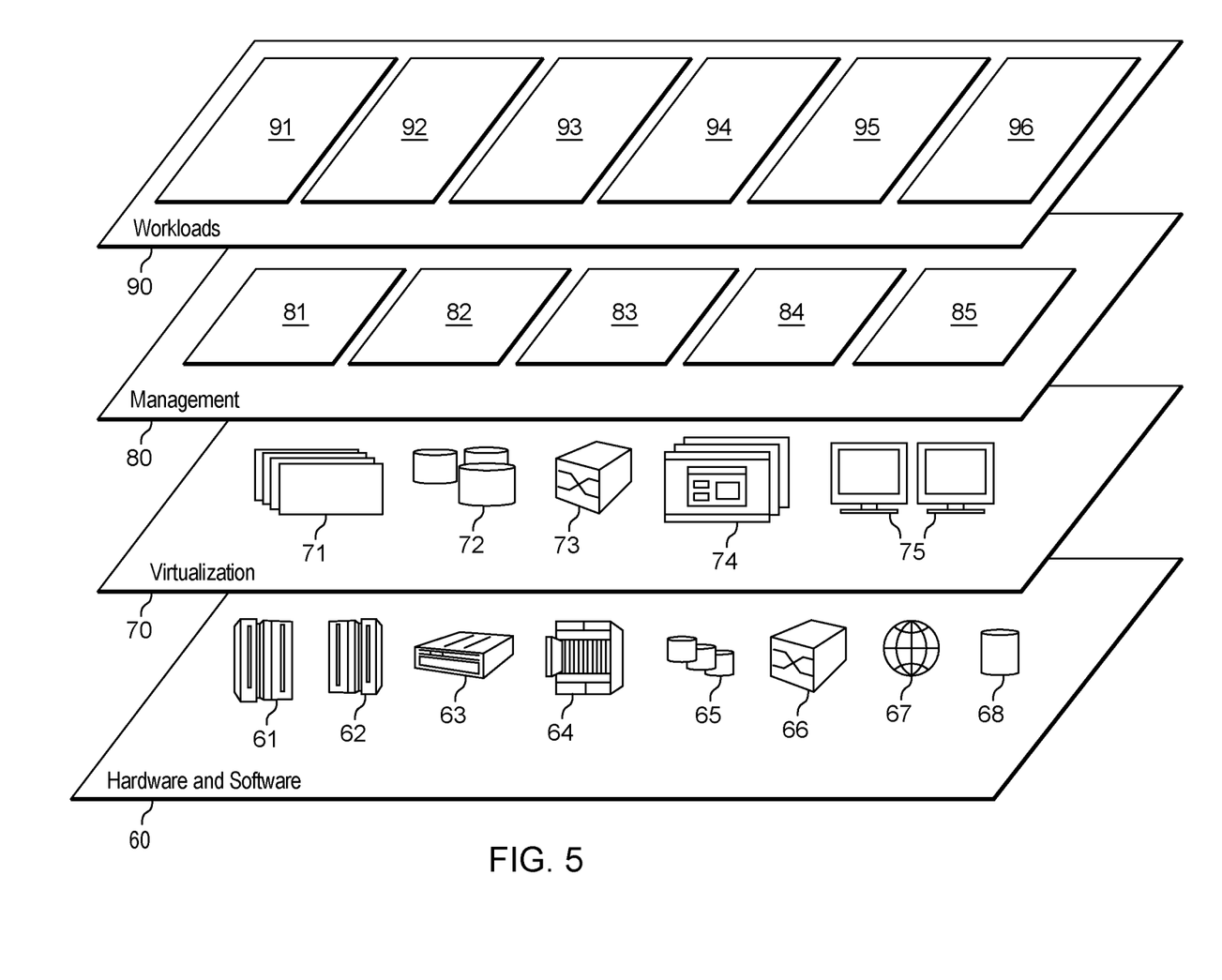
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and counterfactual conversation training 96.

What is claimed is:

1. A computer-implemented method for counterfactual conversation simulation, the computer-implemented method comprising:
   training a conversational agent to simulate a job interview, wherein the conversational agent is trained by a regression model using historical interview dialogs and a corresponding job posting with labeled fit scores for one or more answers;
   generating, by the trained conversational agent, a system output, wherein the system output is a question directed to a user interacting with the conversational agent;
   receiving, by the trained conversational agent, a user input from the user interacting with the conversational agent, wherein the user input includes a response to the system output;
   determining, by the conversational agent, that a system output/user input pair is not satisfactory based, at least in part, on the response to the system output included in the user input having a score below a predetermined threshold; and
   generating, by the conversational agent, and in response to determining the system output/user input pair is not satisfactory, a counterfactual simulation of the response included in the user input based, at least in part, on a target intent of the response included in the user input, wherein generating the counterfactual simulation of the user input includes generating a counterfactual text modifying the user's response until the score is above the predetermined threshold.

2. The computer-implemented method of claim 1, wherein generating the counterfactual text modifying the user's response is further based on:
   determining whether a corpus of candidate texts is available for selection as the counterfactual simulation; and
   responsive to determining that a corpus of candidate texts is available:
      selecting a candidate text from the corpus of candidate texts based on the target intent of the user input.

3. The computer-implemented method of claim 1, wherein generating the counterfactual text modifying the user's response is further based on:
   determining whether a corpus of candidate texts is available for selection as the counterfactual simulation; and
   responsive to determining that a corpus of candidate texts is not available:
      performing a counterfactual text modification of the user input based on the target intent of the user input.

4. The computer-implemented method of claim 3, where generating the counterfactual text modifying the user's response includes:
   identifying salient words in the user response; and
   replacing the salient words with semantically similar words.

5. The computer-implemented method of claim 1, wherein the target intent of the user input is an understanding of the user input by the conversational agent.

6. The computer-implemented method of claim 1, wherein the target intent of the user input is a personality attribute associated with the user input.

7. A computer program product for counterfactual conversation simulation, the computer program product comprising one or more computer readable storage media and program instructions stored on the one or more computer readable storage media, the program instructions including instructions to:
   train a conversational agent to simulate a job interview, wherein the conversational agent is trained by a regression model using historical interview dialogs and a corresponding job posting with labeled fit scores for one or more answers;
   generate, by the trained conversational agent, a system output, wherein the system output is a question directed to a user interacting with the conversational agent;
   receive, by the trained conversational agent, a user input from the user interacting with the conversational agent, wherein the user input includes a response to the system output;
   determine, by the conversational agent, that a system output/user input pair is not satisfactory based, at least in part, on the response to the system output included in the user input having a score below a predetermined threshold; and
   generate, by the conversational agent, and in response to determining the system output/user input pair is not satisfactory, a counterfactual simulation of the response included in the user input based, at least in part, on a target intent of the response included in the user input, wherein generating the counterfactual simulation of the user input includes generating a counterfactual text modifying the user's response until the score is above the predetermined threshold.

8. The computer program product of claim 7, wherein the instructions to generate the counterfactual text modifying the user's response is further based on instructions to:
   determine whether a corpus of candidate texts is available for selection as the counterfactual simulation; and responsive to determining that a corpus of candidate texts is available:
  select a candidate text from the corpus of candidate texts based on the target intent of the user input.

9. The computer program product of claim 7, wherein the instructions to generate the counterfactual text modifying the user's response is further based on instructions to:
  determine whether a corpus of candidate texts is available for selection as the counterfactual simulation; and
  responsive to determining that a corpus of candidate texts is not available:
    perform a counterfactual text modification of the user input based on the target intent of the user input.

10. The computer program product of claim 9, where the instructions to generate the counterfactual text modifying the user's response further includes instructions to:
  identify salient words in the user response; and
  replace the salient words with semantically similar words.

11. The computer program product of claim 7, wherein the target intent of the user input is an understanding of the user input by the conversational agent.

12. The computer program product of claim 7, wherein the target intent of the user input is a personality attribute associated with the user input.

13. A computer system for counterfactual conversation simulation, comprising:
  one or more computer processors;
  one or more computer readable storage media;
  computer program instructions;
  the computer program instructions being stored on the one or more computer readable storage media for execution by the one or more computer processors; and
  the computer program instructions including instructions to:
    train a conversational agent to simulate a job interview, wherein the conversational agent is trained by a regression model using historical interview dialogs and a corresponding job posting with labeled fit scores for one or more answers;
    generate, by the trained conversational agent, a system output, wherein the system output is a question directed to a user interacting with the conversational agent;
    receive, by the trained conversational agent, a user input from the user interacting with the conversational agent, wherein the user input includes a response to the system output;
    determine, by the conversational agent, that a system output/user input pair is not satisfactory based, at least in part, on the response to the system output included in the user input having a score below a predetermined threshold; and
    generate, by the conversational agent, and in response to determining the system output/user input pair is not satisfactory, a counterfactual simulation of the response included in the user input based, at least in part, on a target intent of the response included in the user input, wherein generating the counterfactual simulation of the user input includes generating a counterfactual text modifying the user's response until the score is above the predetermined threshold.

14. The computer system of claim 13, wherein the instructions to generate the counterfactual text modifying the user's response is further based on instructions to:
  determine whether a corpus of candidate texts is available for selection as the counterfactual simulation; and
  responsive to determining that a corpus of candidate texts is available:
    select a candidate text from the corpus of candidate texts based on the target intent of the user input.

15. The computer system of claim 13, wherein the instructions to generate the counterfactual text modifying the user's response is further based on instructions to:
  determine whether a corpus of candidate texts is available for selection as the counterfactual simulation; and
  responsive to determining that a corpus of candidate texts is not available:
    perform a counterfactual text modification of the user input based on the target intent of the user input.

16. The computer system of claim 15, where the instructions to generate the counterfactual text modifying the user's response further includes instructions to:
  identify salient words in the user response; and
  replace the salient words with semantically similar words.

17. The computer system of claim 13, wherein the target intent of the user input is an understanding of the user input by the conversational agent.

* * * * *